United States Patent
Zhang et al.

(10) Patent No.: US 11,855,519 B2
(45) Date of Patent: Dec. 26, 2023

(54) BEARING STATOR, COMPRESSOR AND CONDITIONER

(71) Applicant: GREE ELECTRIC APPLIANCES, INC. OF ZHUHAI, Zhuhai (CN)

(72) Inventors: Chao Zhang, Zhuhai (CN); Fang Zhang, Zhuhai (CN); Gao Gong, Zhuhai (CN); Jiuzhan Su, Zhuhai (CN); Xin Li, Zhuhai (CN); Ruhao Dong, Zhuhai (CN); Mingxing Deng, Zhuhai (CN); Penghui Liu, Zhuhai (CN); Fei Wang, Zhuhai (CN); Rui Wu, Zhuhai (CN); Weijie Zhao, Zhuhai (CN); Zhitao Wei, Zhuhai (CN); Jianhui Wang, Zhuhai (CN); Dunying Zhong, Zhuhai (CN); Zhanqin Liu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 316 days.

(21) Appl. No.: 17/319,356

(22) Filed: May 13, 2021

(65) Prior Publication Data
US 2021/0265894 A1 Aug. 26, 2021

Related U.S. Application Data

(63) Continuation of application No. PCT/CN2019/107282, filed on Sep. 23, 2019.

(30) Foreign Application Priority Data

Dec. 18, 2018 (CN) .......................... 201811550030.4

(51) Int. Cl.
*H02K 7/09* (2006.01)
*F16C 32/04* (2006.01)
*H02K 5/16* (2006.01)

(52) U.S. Cl.
CPC ........... *H02K 7/09* (2013.01); *F16C 32/0461* (2013.01); *H02K 5/16* (2013.01); *F16C 2380/26* (2013.01)

(58) Field of Classification Search
CPC ... F16C 32/0461; F16C 2380/26; H02K 7/09; H02K 5/16
(Continued)

(56) References Cited

U.S. PATENT DOCUMENTS

2006/0077026 A1  4/2006  Chung

FOREIGN PATENT DOCUMENTS

CN    104696361 A    6/2015
CN    105351358 A    2/2016
(Continued)

OTHER PUBLICATIONS

Notice of Reasons for Refusal issued in counterpart Japanese Patent Application No. 2021-530168, dated May 27, 2022.
(Continued)

*Primary Examiner* — Terrance L Kenerly
(74) *Attorney, Agent, or Firm* — Westbridge IP LLC (57) ABSTRACT

The present disclosure provides a magnetic suspension bearing stator, a compressor and an air conditioner. The bearing stator includes a frame, a bearing iron core and an axial winding, the frame is provided with an accommodation recess used to position the axial winding. A position-limiting portion is disposed in the accommodation recess, and the position-limiting portion is used to keep the axial winding in the accommodation recess. The frame is provided with a first positioning portion for connecting with the bearing iron core on the outer wall surfaces of both sides of the accommodation recess. The frame is not easy to come out from the bearing core, and the axial winding is not easy to come out (Continued)

from the frame, so that the relative position between the axial winding and the bearing iron core is fixed.

20 Claims, 5 Drawing Sheets

(58) Field of Classification Search
USPC .......................................................... 310/90.5
See application file for complete search history.

(56) References Cited

FOREIGN PATENT DOCUMENTS

| CN | 205136373 U | 4/2016 |
|----|-------------|--------|
| CN | 205278108 U | 6/2016 |
| CN | 205371309 U | 7/2016 |
| CN | 107559302 A | 1/2018 |
| CN | 104696361 B | 2/2018 |
| CN | 108644230 A | 10/2018 |
| CN | 109654121 A | 4/2019 |
| CN | 209687928 U | 11/2019 |
| JP | H11311251 A | 11/1999 |
| JP | 2007155058 A | 6/2007 |
| JP | 2008236925 A | 10/2008 |
| JP | 2014051995 A | 3/2014 |
| JP | 2016114114 A | 6/2016 |

OTHER PUBLICATIONS

Written Opinion issued in corresponding PCT Application No. PCT/CN2019/107282, dated Dec. 19, 2019.
International Search Report issued in corresponding PCT Application No. PCT/CN2019/107282, dated Dec. 19, 2019.
Extended European Search Report issued in counterpart European Patent Application No. 19898490.8, dated Nov. 5, 2021.

BEARING STATOR, COMPRESSOR AND CONDITIONER

CROSS-REFERENCE TO RELATED APPLICATIONS

The present application is a continuation of International Application No. PCT/CN2019/107282 filed on Sep. 23, 2019, which claims priority to Chinese patent application No. 201811550030.4 filed on Dec. 18, 2018. Both applications are incorporated herein by reference in their entireties.

TECHNICAL FIELD

The present disclosure relates to the technical field of magnetic bearing stators, and more specifically, to a bearing stator, a compressor and an air conditioner.

BACKGROUND

In a magnetic suspension bearing, a rotor is suspended in the air by magnetic force, so that there is no mechanical contact between the rotor and a stator.

The inventor found that: an iron core of the magnetic suspension bearing is not fixed to a winding steadily, resulting in that detaching occurs frequently, and it is difficult to locate the winding.

SUMMARY

According to an aspect of some embodiments of the present disclosure, the present disclosure provides a bearing stator, a compressor and an air conditioner to optimize the structure of the bearing stator.

Embodiments of the present disclosure provide a bearing stator. The bearing stator includes:

a frame, the frame being provided with an accommodation recess, a position-limiting portion is disposed in the accommodation recess, and each of outer wall surfaces at two sides of the accommodation recess being provided with a first positioning portion;

a bearing iron core, any one of axial end surfaces of the bearing iron core being provided with a winding groove, the winding groove being provided with a second positioning portion on two opposite sides of the bearing iron core along a radial direction of the bearing iron core, and the second positioning portion being clamped with the first positioning portion; and an axial winding, located in the winding groove, and a part, corresponding to the frame, of the axial winding being pressed into the accommodation recess;

wherein the position-limiting portion is used to limit the axial winding in the accommodation recess.

In some embodiments, a length of the frame along a circumferential direction of the bearing iron core is less than a circumferential length of the axial winding.

In some embodiments, the accommodation recess is a through recess, the position-limiting portion is a protrusion at a recess opening of the accommodation recess.

In some embodiments, from a recess opening to a recess bottom of the accommodation recess, the accommodation recess sequentially includes:

a first section recess, each of two side surfaces of the first section recess being disposed to be perpendicular to a bottom of the accommodation recess; and a second section recess, each of two side surfaces of the second section recess being disposed to be inclined to a bottom of the accommodation recess, and an inclination direction of one of the two side surfaces of the second section recess being opposite to an inclination direction of another of the two side surfaces of the second section recess.

In some embodiments, the first positioning portion includes one of the following: a convex structure and a concave structure.

In some embodiments, the frame includes:

a bottom arm; and two side arms, each of the two side arms being made of elastic material, an inner side of each of the two side arms being provided with the position-limiting portion, and each of outer sides of the two side arms being provided with the first positioning portion.

In some embodiments, the frame is provided with at least one winding wire through hole communicated with the accommodation recess.

In some embodiments, the frame is provided with two winding wire through holes at a bottom of the frame.

In some embodiments, the winding groove is an annular groove, and an axis of the winding groove is coaxial with an axis of the bearing iron core.

In some embodiments, the second positioning portion is a concave structure or a convex structure matched with the first positioning portion.

In some embodiments, the bearing stator includes a plurality of the frames disposed in the winding groove at intervals.

In some embodiments, a side of the bearing iron core facing away from the winding groove is provided with a through hole for a winding wire to pass through, the through hole corresponds to the frame and is communicated to the winding groove; and the bottom of the frame is provided with a convex portion matched with the through hole, the convex portion is used to locate the frame and the bearing iron core.

In some embodiments, the through hole is an elliptical hole, and a length of through hole in the long axis direction is less than a length of a bottom of the frame.

In some embodiments, the length of the frame in the direction of matching the winding groove is equal to the width of the winding groove; and a height of the frame is less than, equal to or greater than a depth of the winding groove.

In some embodiments, potting glue used to seal and fasten the axial winding is provided in the winding groove.

In some embodiments, the axial winding is provided with a first winding wire and a second winding wire, a bottom of the frame is provided with a first winding wire through hole and a second winding wire through hole; and the first winding wire passes through the first winding wire through hole and extends to a side of the bearing iron core facing away from the winding groove, the second winding wire passes through the second winding wire through hole and extends to a side of the bearing iron core facing away from the winding groove.

Embodiments of the present disclosure further provide a compressor which includes a bearing stator provided by any one of the embodiments of the present disclosure.

Embodiments of the present disclosure further provide an air conditioner which includes a compressor provided by any one of the embodiments of the present disclosure.

Embodiments of the present disclosure provide a magnetic suspension frame. The frame is provided with an accommodation recess used to locate an axial winding.

A position-limiting portion is disposed in the accommodation recess, the position-limiting portion is used to limit the axial winding in the accommodation recess, the frame is provided with a first positioning portion located on wall surfaces at two side of the accommodation recess, and the first positioning portion is used to connect with the bearing iron core.

In some embodiments, in one embodiment of the present disclosure, a length of the above-mentioned frame along a circumferential direction of the bearing core is less than a circumferential length of the axial winding.

In some embodiments, the frame is a block structure, a length of the frame along a radial direction of the bearing iron core is less than a radius of the bearing iron core.

In some embodiments, the accommodation recess is a through recess, and the position-limiting portion is a protrusion at a recess opening of the accommodation recess.

In some embodiments, the accommodation recess is connected with the bearing iron core in a self-locking way by the first positioning portion.

In some embodiments, the accommodation recess includes a first section recess and a second section recess arranged in sequence from the recess opening to a recess bottom.

Each of two side surfaces of the first section recess is disposed to be perpendicular to the bottom of the accommodation recess, each of two side surfaces of the second section recess is disposed to be inclined to the bottom of the accommodation recess, and an inclination direction of one of the two side surfaces of the second section recess is opposite to an inclination direction of another of the two side surfaces of the second section recess.

In some embodiments, the above-mentioned first positioning portion is a convex structure or a concave structure in one embodiment of the present disclosure.

In some embodiments, the first positioning portion is a convex structure with a triangular cross section.

In some embodiments, the above-mentioned frame includes a bottom arm and two side arms made of elastic material in one embodiment of the present disclosure; an inner side of each of the two side arms are provided with a position-limiting portion, an outer side of each of the two side arms are provided with a first positioning portion.

In some embodiments, in a case where the two side arms of the frame are pressed, the two side arms are inclined towards each other relative to the bottom arm. In a case where the frame is not subjected to external force, the two side arms restore original state, and the two side arms are perpendicular to the bottom arm.

In some embodiments, in one embodiment of the present disclosure, the above-mentioned frame is provided with at least one winding wire through hole.

In some embodiments, in one embodiment of the present disclosure, the frame is provided with two above-mentioned wire through holes at the bottom of the frame.

In a second aspect, the present disclosure provides a bearing assembly which includes the above-mentioned magnetic suspension frame.

In some embodiments, in one embodiment of the present disclosure, the above-mentioned bearing assembly further includes a bearing iron core.

Any one of axial end surfaces of the bearing iron core is provided with a winding groove, the winding groove is provided with a second positioning portion on two opposite sides of the bearing iron core along a radial direction of the bearing iron core, and the second positioning portion is clamped to the first positioning portion.

In some embodiments, the above-mentioned winding groove is an annular groove, and the winding groove is coaxial with the bearing iron core.

In some embodiments, in one embodiment of the present disclosure, the second positioning portion is a concave structure or a convex structure, and the concave structure or the convex structure is matched with the first positioning portion.

In some embodiments, the first positioning portion is a convex structure, the second positioning portion is a concave structure matched with the first positioning portion, and the second positioning portion is an annular groove.

In some embodiments, in one embodiment of the present disclosure, a plurality of the frames are disposed in the winding groove at intervals.

In some embodiments, in one embodiment of the present disclosure, a side of the above-mentioned bearing iron core facing away from the winding groove is provided with a through hole for a winding wire to pass through, and the through hole corresponds to the frame and is communicated to the winding groove.

The bottom of the frame is provided with a convex portion matched with the through hole, the convex portion is used to locate the frame and the bearing iron core.

In some embodiments, in one embodiment of the present disclosure, the length, along a direction of matching the winding groove, of the above-mentioned frame is equal to the width of the winding groove;

The height of the frame is less than, equal to or greater than the depth of the winding groove.

In some embodiments, in one embodiment of the present disclosure, the through hole is an elliptical hole, and the length of through hole in the long axis direction is less than the length of the bottom of the frame.

In a third aspect, the present solution provides a bearing stator which includes the above-mentioned bearing assembly.

In some embodiments, in an embodiment of the present disclosure, the above-mentioned bearing stator further includes an axial winding located in the winding groove, a part, corresponding to the frame, of the axial winding is pressed into the accommodation recess.

In some embodiments, in one embodiment of the present disclosure, potting glue used to seal and fasten the axial winding is provided in the winding groove.

In some embodiments, in one embodiment of the present disclosure, the axial winding is provided with a first winding wire and a second winding wire, and the bottom of the frame is provided with a first winding wire through hole and a second winding wire through hole.

The first winding wire passes through the first winding wire through hole and extends to a side of the bearing iron core facing away from the winding groove, and the second winding wire passes through the second winding wire through hole and extends to a side of the bearing iron core facing away from the winding groove.

In a fourth aspect, the present solution provides a compressor which includes the above-mentioned bearing stator.

In a fifth aspect, the present solution provides an air conditioner which includes the above-mentioned compressor.

The beneficial effects of embodiments of the present disclosure are as follows. In the bearing stator which is provided by the solution of above-mentioned embodiments, the frame matches with the bearing iron core, that is, the frame is provided with a first positioning portion on outer wall surfaces at two sides of the accommodation recess, the first positioning portion is used to connect with the bearing iron core, so as to effectively prevent the frame from detaching from the bearing iron core. A position-limiting portion is disposed in the accommodation recess, in a case where the axial winding has been positioned in the accommodation recess, the position-limiting portion makes it difficult for the axial winding to detach from the frame. An end surface of the bearing iron core is provided with a winding groove, the axial winding is disposed in the winding groove, and the frame prevents the axial winding from detaching and locates the axial winding.

BRIEF DESCRIPTION OF DRAWINGS

In order to more clearly illustrate the technical solution of embodiments of the present disclosure, the following will briefly introduce the drawings to be used in the embodiments. It should be understood that the following drawings only show some embodiments of the present disclosure, so they should not be regarded as the limitation of the scope. For those skilled in the art, based on these drawings, other related drawings can be obtained without creative work.

DETAILED DESCRIPTION

To make the objectives, technical solutions and advantages of embodiments of the present disclosure clearer, the following clearly and completely describes the embodiments of the present disclosure in detail with reference to the accompanying drawings. Obviously, the described embodiments are part of the embodiments of the present disclosure, not all of them. The components of the embodiments of the present disclosure, which are generally described and shown in the accompanying drawings herein, may be arranged and designed in a variety of different configurations.

Therefore, the following detailed description of the embodiments of the present disclosure provided in the accompanying drawings is not intended to limit the scope of the claimed disclosure, but merely represents the selected embodiments of the present disclosure. Based on the embodiments in the present disclosure, all other embodiments obtained by the skilled in the art without making creative work belong to the protection scope of the present disclosure.

It should be noted that similar labels and letters indicate similar items in the following drawings. Therefore, once an item is defined in an embodiment of one drawing, there is no need to further define and explain it in that of subsequent drawings.

In the description of the present disclosure, it should be noted that the orientation or position relationship indicated by the terms "center", "up", "down", "left", "right", "vertical", "horizontal", "inside" and "outside" is based on the orientation or position relationship shown in the drawings, or the orientation or position relationship normally placed when the product of the invention is used. It is only for the convenience of describing the present disclosure and simplifying the description, rather than indicating or implying that the device or element referred to must have a specific orientation, or must be constructed and operate in a specific orientation. Therefore, it cannot be understood as a limitation of the present disclosure. In addition, the terms "first", "second", "third" and so on are only used to distinguish descriptions and cannot be understood as indicating or implying relative importance.

In addition, the term "horizontal" refers to an angle of 0 degrees from the horizontal plane, and "vertical" refers to the direction of gravity. When describing parts or structures are "horizontal" or "vertical" in this paper, due to machining accuracy errors and other factors, it does not mean that the parts are required to be absolutely horizontal or overhanging, but can be slightly tilted.

In the description of the present disclosure, it should also be noted that unless otherwise specified and limited, the terms "setting", "installation", "connect with" and "connected to" should be understood in a broad sense. For example, it may be fixed connection, detachable connection or integrated connection; it may be mechanical connection or electrical connection; it may be directly connected or indirectly connected through intermediate media, or may be the internal communication of two components. For those of ordinary skill in the art, the specific meanings of the above terms in the present disclosure can be understood in specific circumstances.

Referring to FIG. 1-FIG. 7f, this embodiment provides a magnetic suspension frame, a bearing assembly, a bearing stator and an air conditioner.

Embodiments of the present disclosure provide a magnetic suspension frame. Frame 1 is provided with an accommodation recess 11 used to locate an axial winding 3. A position-limiting portion 110 is disposed in the accommodation recess 11. The position-limiting portion 110 is used to limit the axial winding 3 in the accommodation recess 11. Each of outer wall surfaces of the frame 1 at two sides of the accommodation recess 11 is provided with a first positioning portion 12, and the first positioning portion 12 is used to connect with the bearing iron core 2. The cross-sectional shape of the first positioning portion 12 is triangular.

Figure 1:
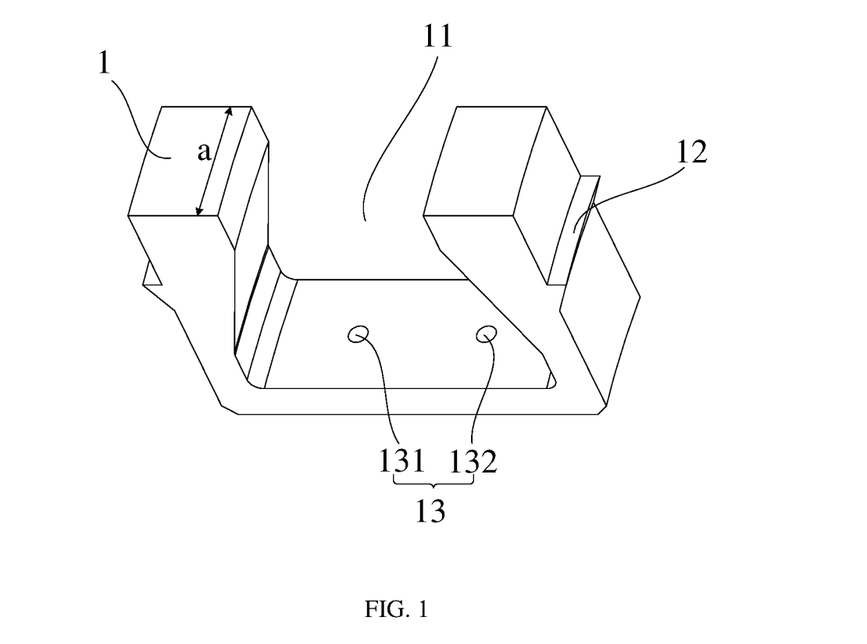
FIG. 1 is a schematic perspective view of a frame provided by some embodiments of the present disclosure.
Figure 4:
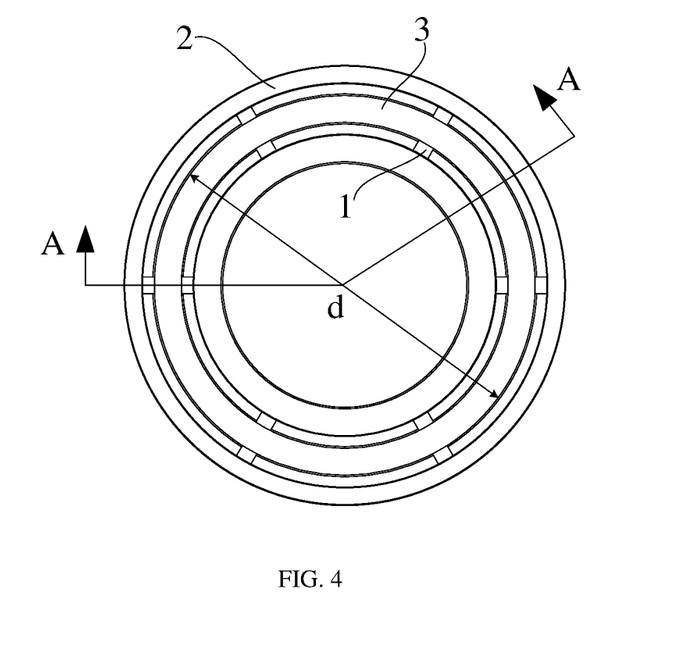
FIG. 4 is a top view of a stator structure of some embodiments of the present disclosure.

As shown in FIG. 1 and FIG. 4, the length a of the frame 1 in the circumferential direction of the bearing iron core 2 is less than the circumferential length ad of the axial winding 3, wherein d is the diameter of the outer contour of the axial winding 3, it is Pi. The frame 1 is a block structure. The length of the frame 1 in the radial direction of the bearing iron core 2 is less than the radius of the bearing iron core 2. The accommodation recess 11 is a through recess. The position-limiting portion 110 is a protrusion at the recess opening of the accommodation recess 11. The accommodation recess 11 is connected with the bearing iron core 2 in a self-locking way by the first positioning portion 12. The accommodation recess 11 includes a first section recess 111 and a second section recess 112 arranged in sequence from the recess opening to the recess bottom. Each of two side surfaces of the first section recess 111 is disposed to be perpendicular to the bottom of the accommodation recess 11. Each of two side surfaces of the second section recess 112 is disposed to be inclined to the bottom of the accommodation recess 11, and the inclination direction of one of the two side surfaces of the second section recess 112 is opposite to the inclination direction of another of the two side surfaces of the second section recess 112. The first section recess 111 is a straight recess. The second section recess 112 is a flared recess. The opening size of the recess bottom of the second section recess 112 is greater than the opening size of the recess opening of the first second recess 111. The opening size of the first section recess 111 is equal to the opening size of the top of the recess opening of the second section recess 112. The recess walls of the first section recess 111 serve as the position-limiting portion 110 described above.

The structure of the accommodation recess 11 of the frame 1 has been analyzed above. The wall of the frame 1 is analyzed below. The frame 1 includes a bottom arm 15 and two side arms 16, the two side arms 16 are made of elastic material. Inner side of each of the two side arms 16 is provided with a position-limiting portion 110. Outer side of each of the two side arms 16 is provided with a first positioning portion 12. In a case where the two side arms 16 are pressed towards each other, the two side arms 16 are inclined towards each other relative to the bottom arm 15. In a case where the frame 1 is not subjected to external force, the two side arms 16 are recovered to a original state, as shown in FIG. 1, the side surfaces of the two side arms 16 are perpendicular to the bottom arm 15. The frame 1 is provided with winding wire through holes 13. The wire through holes 13 are provided at the bottom of the frame 1, and the wire through holes 13 include two winding wire through holes.

Figure 2:
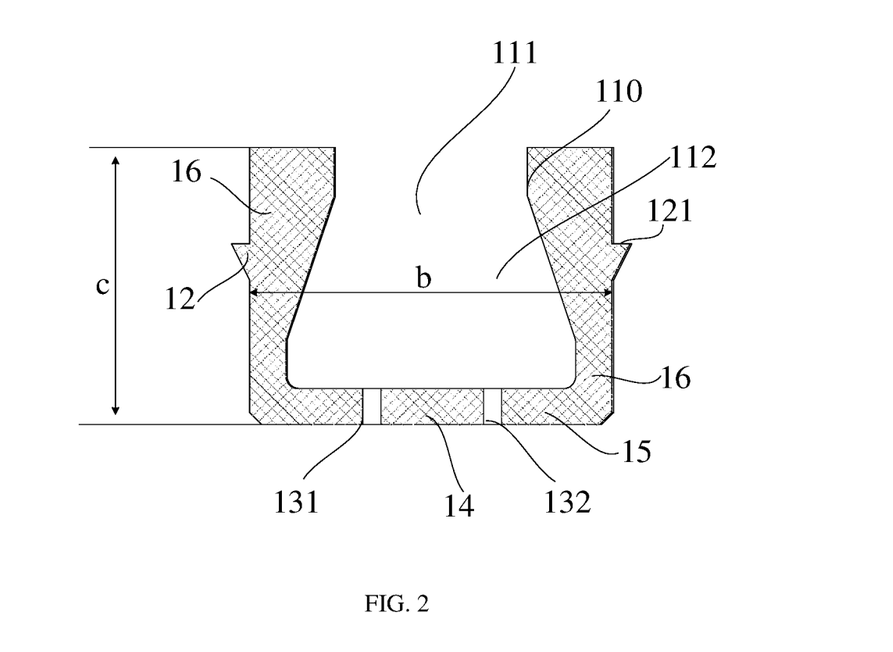
FIG. 2 is a schematic front view of a frame provided by some embodiments of the present disclosure.

In combination with FIG. 1 and FIG. 2, the fame 1 is connected to a bearing stator. The frame 1 includes an accommodation recess 11. The accommodation recess 11 is a through recess. Two side surfaces of the accommodation recess 11 at the recess opening are provided with the position-limiting portions 110. In a case where a part of the axial winding 3 is located in the accommodation recess 11, the position-limiting portions 110 prevent the axial winding 3 from detaching from the accommodation recess 11. The position-limiting portion 110 is a protrusion, or the position-limiting portion 110 is a necking structure at the recess opening of the accommodation recess 11.

The bottom of the frame 1 is provided with winding wire through holes 13. The outer side of each of the two side arms 16 of the frame 1 is provided with a first positioning portion 12. The cross-section shape of the first positioning portion 12 along the vertical direction of the frame 1 is triangular. The surface of the first positioning portion 12 facing a direction which the recess opening of the accommodation recess 11 faces (that is, the surface 121 shown in FIG. 2) is perpendicular to the frame 1. Outer side surfaces of the two side arms 16 are disposed to be perpendicular to the bottom arm 15. In a case where the two side arms 16 of the frame 1 are pressed towards each other, the two side arms 16 are inclined towards each other relative to the bottom arm 15. In a case where the frame 1 is not subjected to external force, the two arms 16 is recovered to an original state.

The accommodation recess 11 includes a first section recess 111 and a second section recess 112, the first section recess 111 and the second section recess 112 are arranged from the recess opening of the accommodation recess 11 to the recess bottom of the accommodation recess 11. Two sides of the first section recess 111 are disposed to be perpendicular to the bottom of the accommodation recess 11. Two sides of the second section recess 112 are disposed to be inclined to the bottom of the accommodation recess 11, and the inclination direction of one of the two sides of the second section recess 112 is opposite to the inclination direction of another of the two sides of the second section recess 112. In a case where the axial winding 3 is pressed into the accommodation recess 11, the recess opening of the accommodation recess 11 has a position-limiting effect on the axial winding 3 to prevent the axial winding 3 from detaching from the accommodation recess 11, thereby preventing the axial winding 3 from detaching from the bearing iron core 2. That is, a necking structure formed by the first section recess 111 of the accommodation recess 11 is a position-limiting portion 110, and the position-limiting portion 110 prevents the axial winding 3 from detaching from the bearing iron core 2.

Figure 3:
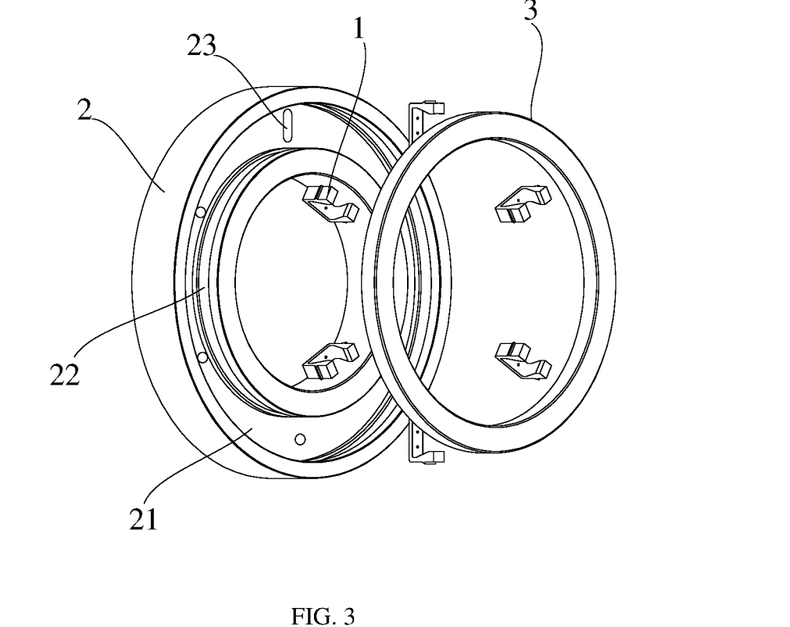
FIG. 3 is a schematic exploded view of a stator structure of some embodiments of the present disclosure.
Figure 5:
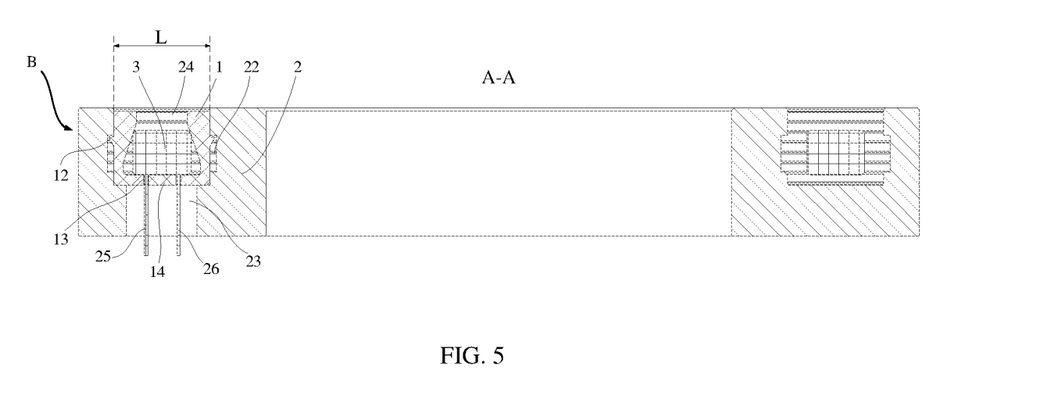
FIG. 5 is a cross-sectional view of FIG. 4 taken along a line A-A provided by some embodiments of the present disclosure.

In combination with FIG. 3, FIG. 4 and FIG. 5, some embodiments of the present disclosure provide a bearing assembly. The bearing assembly is applied to an axial bearing stator. The bearing assembly includes a plurality of magnetic suspension frames 1. The bearing assembly further includes a bearing iron core 2. Any one of axial end surfaces of the bearing iron core 2 is provided with a winding groove 21. The winding groove 21 is provided with a second positioning portion 22 on each of two opposite sides in the radial direction of the bearing iron core 2. The second positioning portion 22 is clamped with the first positioning portion 12. The second positioning portion 22 is an annular groove. The frame 1 is clamped in the winding groove 21 through clamping the first positioning portion 12 and the second positioning portion 22. The first positioning portion 12 and the second positioning portion 22 form a self-locking connection.

Figure 6:
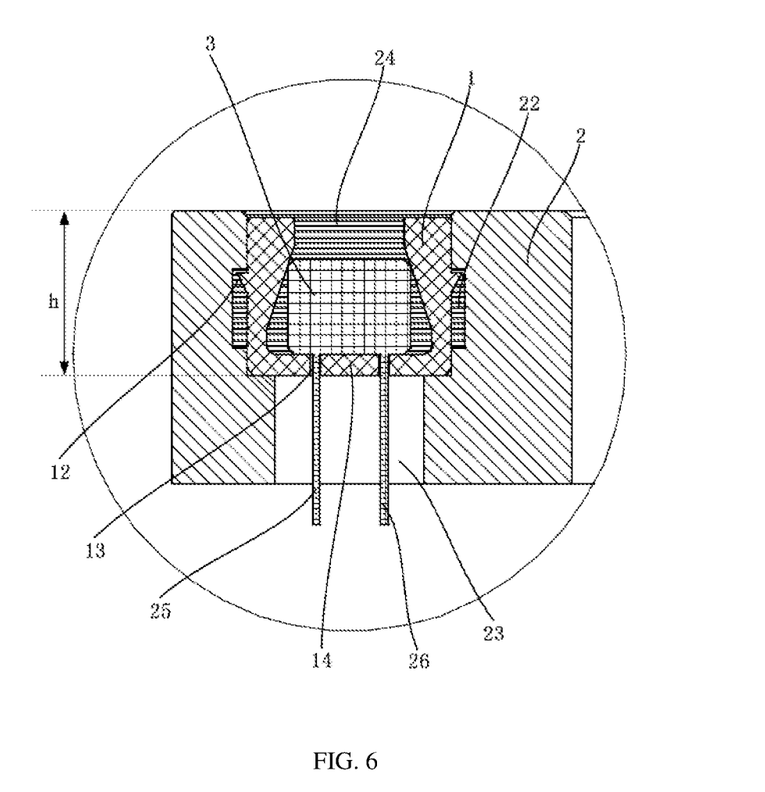
FIG. 6 is a partial enlarged view of part B in FIG. 5.
Figure 7A:
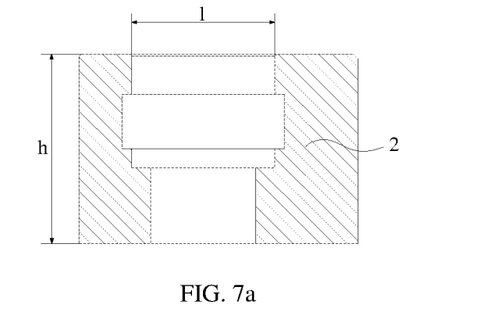
FIG. 7a-FIG. 7f are schematic diagrams shown an assembly process of a bearing stator.
Figure 7B:
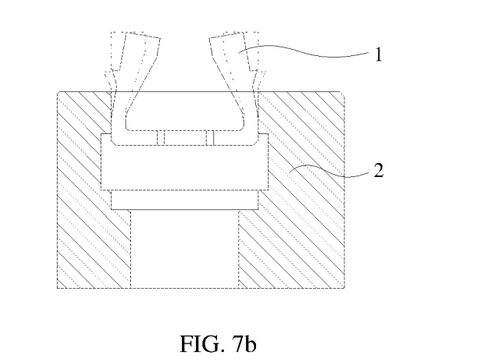
Figure 7C:
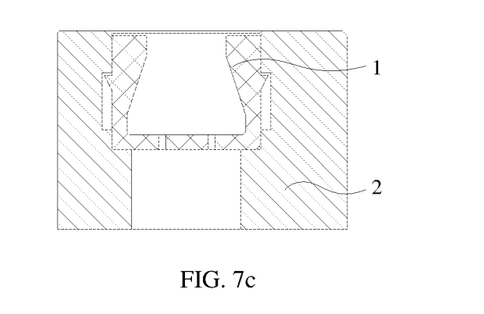
Figure 7D:
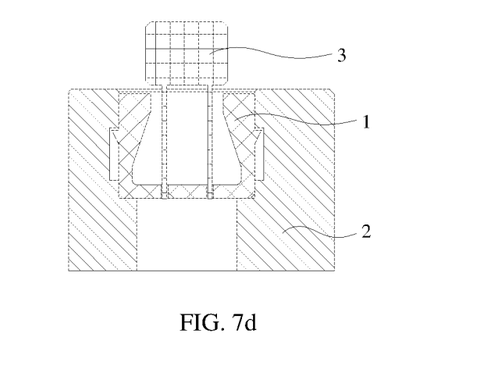
Figure 7E:
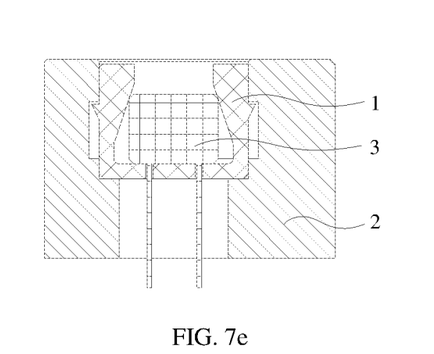
Figure 7F:
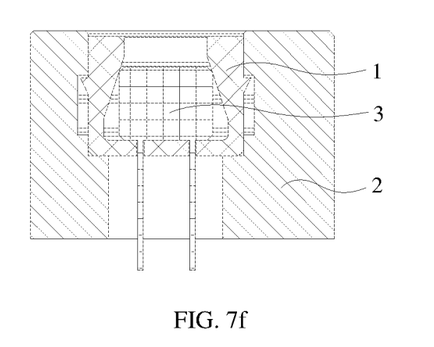

The winding groove 21 is an annular groove, the axis of the winding groove 21 is coaxial with the axis of the bearing iron core 2. A side of the bearing iron core 2 facing away from the winding groove 21 is provided with a through hole 23, corresponding to the frame 1, for a winding wire to pass through. The through hole 23 is communicated to the winding groove 21. The bottom of the frame 1 is provided with a convex portion 14 matched with the through hole 23. The convex portion 14 is a columnar convex. The convex portion 14 is used for positioning and connection between the frame 1 and the bearing iron core 2. The length of the frame 1 in the direction of matching the winding groove 21 is equal to the width of the winding groove 21. The height c of the frame 1 is less than, equal to or greater than the depth h of the winding groove 21, as shown in FIG. 2 and FIG. 6. The through hole 23 is an elliptical hole. The length of through hole 23 in the long axis direction is less than the length of the bottom of the frame 1. In a case where the height of the frame 1 is greater than the depth of the winding groove 21, a part of the frame 1 is exposed from the bearing core 2, and in a case where the bearing core 2 contacts a thrust bearing, the frame 1 contacts the thrust bearing first, so as to avoid the wear of the bearing core 2.

A plurality of frames 1 are arranged in the winding groove 21 with equal center angles. Any one of axial end surfaces of the bearing iron core 2 is provided with a winding groove 21. The winding groove 21 is an annular groove. Each of two wall surfaces of the inner side of the winding groove 21 is provided with a second positioning portion 22 matched with the first positioning portion 12. The second positioning portion 22 is an annular groove disposed on the two wall surfaces of the inner side of the winding groove 21. The length b of the first positioning portion 12 in the radial direction of the bearing iron core 2 is equal to the width L of the winding groove 21, as shown in FIG. 2 and FIG. 5. The length b of the first positioning portion 12 in the radial direction of the bearing iron core 2 refers to the distance between the inner edges of the two first positioning portions 12, as shown in FIG. 2. The distance between the outer edges of the two first positioning portions 12 is slightly larger than the width L of the winding groove 21. During the process of installing, the frame 1 can be installed in place with only a small force.

In a case where the two side arms of the frame 1 are pressed, the two side arms 16 of the frame 1 are inclined relative to the bottom arm 15 of the frame 1. Then, the bottom arm 15 of the frame 1 is aligned with the winding groove 21, and the first positioning portion 12 on each of two sides of the frame 1 is matched with the second positioning portion 22 in the winding groove 21. The cross-sectional shape of the first positioning portion 12 in vertical direction of the frame 1 is triangular. The second positioning portion 22 is an annular groove located on two sides of the winding groove 21. In a case where the frame 1 is not subjected to external force, the two side arms 16 of the frame 1 are perpendicular relative to the bottom arm 15. After the frame 1 is pressed to be installed in the winding groove 21, the first positioning portion 12 and the second positioning portion 22 of the two side arms 16 of the frame 1 are matched, and the frame 1 and the winding groove 21 form a self-locking connection. The depth of the winding groove 21 is less than the height of the frame 1. In a case where the bearing iron core 2 and a thrust bearing are in contact, the frame 1 touches the thrust bearing first to avoid the wear of the bearing core 2.

A side of the bearing iron core 2 facing away from the winding groove 21 is provided with a through hole 23. The through hole 23 corresponds to the frame 1 and is communicated with the winding groove 21. The through hole 23 is an elliptical hole, and the length of through hole 23 in the long axis direction is less than the length of the bottom arm 15 of the frame 1. The winding wire through hole 13 corresponds to the through hole 23. The through hole 23 is used for leading out the first winding wire 25 and the second winding wire 26.

As shown in combination with FIG. 3 to FIG. 6, referring to FIG. 1 and FIG. 2, the present solution provides a bearing stator. The bearing stator includes a bearing assembly and an axial winding 3 which are mentioned above. The axial winding 3 is located in the winding groove 21. The part, corresponding to the frame 1, of the axial winding 3 is pressed into the accommodation recess 11. Potting glue 24 is disposed in the winding groove 21. The axial winding 3 is provided with a first winding wire 25 and a second winding wire 26. The bottom arm 15 of the frame 1 is provided with a through hole 13 corresponding to first winding wire 25 and a through hole 13 corresponding to second winding wire 26. The first winding wire 25 passes through the through hole 13 corresponding to the first winding wire 25 and extends to the side of the bearing iron core 2 facing away from the winding groove 21. The second winding wire 26 passes through the through hole 13 corresponding to the second winding wire 26 and extends to the side of the bearing iron core 2 facing away from the winding groove 21.

The part, corresponding to the frame 1, of the axial winding 3 is pressed into the accommodation recess 11. Potting glue 24 is provided in the winding groove 21. The axial winding 3 is provided with a first winding wire 25 and a second winding wire 26. The winding wire though holes 13 includes a first winding wire through hole 131 and a second winding wire through hole 132. The first winding wire 25 passes through the first winding wire through hole 131 and extends to the side of the bearing iron core 2 facing away from the winding groove 21. The second winding wire 26 passes through the second winding wire through hole 132 and extends to the side of the bearing iron core 2 facing away from the winding groove 21.

Referring to FIG. 7a to FIG. 7f, during the process of assembling the stator, the bearing core 2 is disposed with the side provided with the winding groove 21 facing upwards, the two side arms 16 of the frame 1 at the opening recess are pressed, the two side arms 16 are inclined towards each other, and the frame 1 is put into the winding groove 21. Then, the two sides of the frame 1 are fitted with the two side surfaces of the winding groove 21, the bottom of the frame 1 is in contact with the bottom of the winding groove 21, and the first positioning portion 12 is matched with the second positioning portion 22 in the winding groove 21. After the frame 1 is completely installed in the winding groove 21, the two side arms of the frame 1 fit the two side walls of the winding groove 21, and the first positioning portion 12 is clamped with the second positioning portions 22 to prevent the frame 1 from detaching from the winding groove 21 during the rotation of the bearing core 2. The two side surfaces of the recess opening of the accommodation recess 11 are provided with position-limiting portion 110, or the recess opening of the accommodation recess 11 has a necking structure, so as to prevent the axial winding 3 from detaching from the bearing core 2.

Referring to FIG. 7a to FIG. 7f, the frame 1 is rotated along the circumferential direction of the winding groove 21 to make any one of the frames 1 correspond to the through hole 23. The first winding wire through hole 131 and the second wire through hole 132 are disposed at the bottom of the frame 1. Both the first winding wire through hole 131 and the second wire through hole 132 correspond to the through hole 23, and the other frames 1 are uniformly distributed in the winding groove 21 in the circumferential direction. The axial winding 3 having been wound is placed in the winding groove 21, the first winding wire 25 passes through the first winding wire through hole 131 and extends to the side of the bearing core 2 facing away from the winding groove 21 by the through hole 23, and the second winding wire 26 passes through the second winding wire through hole 132 and extends to the side of the bearing core 2 facing away from the winding slot 21 by the through hole 23, such that the axial winding 3 is pressed into the frame 1. The axial winding 3 itself has a certain sealing effect on the first winding wire through hole 131 and the second winding wire through hole 132. The potting glue 24 is poured into the winding groove 21 with the axial winding 3 until the potting glue 24 reaches the top of the support frame 1, and then the potting glue 24 is heated and dried to complete the potting.

On the basis of the above structure and principle, the embodiment also provides a compressor which includes the above bearing stator, and the bearing stator is matched with the compressor rotor.

On the basis of the above structure and principle, the embodiment further provided an air conditioner which includes the compressor described above.

The frame 1 in the present solution adopts a single block structure, which reduces the material required for the frame 1. It is easy to manufacture the frame 1, and it is easy to make a mold. The winding groove 21 is arranged on the axial end surface of the bearing iron core 2, The frame 1 is clamped with the winding groove 21 through a self-locking structure to prevent the frame 1 from detaching. The frame 1 is provided with an accommodation recess 11 which is used to accommodate the axial winding 3. The recess opening of the accommodation recess 11 is smaller than the recess bottom of the accommodation recess 11. The accommodation recess 11 may be a horn shape recess or a conical recess, so that it is not easy for the axial winding 3 to detaching after the axial winding 3 is pressed into the accommodation recess 11. The structure of the frame 1 reduces its own consumables, the mold is simple and easy to manufacture. In addition, the frame 1 has strong versatility, for the bearing core 2 or winding with different structures, only the size of the frame 1 needs to be changed.

In the description of the present disclosure, it is to be understood that the orientation or position relationships indicated by the terms "center", "longitudinal", "transverse", "front", "back", "left", "right", "vertical", "horizontal", "top", "bottom", "inside", "outside" and so on are based on the orientation or position relationships shown in the drawings, only for the convenience of describing the present disclosure and simplifying the description Therefore, it cannot be understood as a limitation of the scope of protection of the present disclosure.

Finally, it should be noted that: the above embodiments are only used to illustrate the technical solutions of the present disclosure, not to limit them; although the present disclosure has been described in detail with reference to the better embodiments, those skilled in the art should understand that the specific embodiments of the present disclosure can still be modified or some technical features can be replaced equivalently; without departing from the technical aspects of the present disclosure The spirit of the case shall be covered in the scope of the technical solution claimed in the present disclosure.

What is claimed is:

1. A bearing stator, comprising:
   a frame, the frame being provided with an accommodation recess, a position-limiting portion being disposed in the accommodation recess, and each of outer wall surfaces at two sides of the accommodation recess being provided with a first positioning portion;
   a bearing iron core, any one of axial end surfaces of the bearing iron core being provided with a winding groove, the winding groove being provided with a second positioning portion on two opposite sides of the bearing iron core along a radial direction of the bearing iron core, and the second positioning portion being clamped with the first positioning portion; and
   an axial winding, the axial winding being located in the winding groove, and a part, corresponding to the frame, of the axial winding being pressed into the accommodation recess;
   wherein the position-limiting portion is used to limit the axial winding in the accommodation recess.

2. The bearing stator according to claim 1, wherein a length of the frame along a circumferential direction of the bearing iron core is less than a circumferential length of the axial winding.

3. The bearing stator according to claim 1, wherein the accommodation recess is a through recess, and the position-limiting portion is a protrusion at a recess opening of the accommodation recess.

4. The bearing stator according to claim 1, wherein from a recess opening to a recess bottom of the accommodation recess, the accommodation recess sequentially comprises:
   a first section recess, each of two side surfaces of the first section recess being disposed to be perpendicular to a bottom of the accommodation recess; and
   a second section recess, each of two side surfaces of the second section recess being disposed to be inclined to the bottom of the accommodation recess, and an inclination direction of one of the two side surfaces of the second section recess being opposite to an inclination direction of another of the two side surfaces of the second section recess.

5. The bearing stator according to claim 1, wherein the first positioning portion comprises one of a convex structure and a concave structure.

6. The bearing stator according to claim 5, wherein the second positioning portion is the concave structure or the convex structure matched with the first positioning portion.

7. The bearing stator according to claim 1, wherein the frame comprises:
   a bottom arm; and
   two side arms, each of the two side arms being made of elastic material, an inner side of each of the two side arms being provided with the position-limiting portion, and each of outer sides of the two side arms being provided with the first positioning portion.

8. The bearing stator according to claim 1, wherein the frame is provided with a winding wire through hole communicated with the accommodation recess.

9. The bearing stator according to claim 8, wherein two of the winding wire through holes are disposed at a bottom of the frame.

10. The bearing stator according to claim 1, wherein the winding groove is an annular groove, and an axis of the winding groove is coaxial with an axis of the bearing iron core.

11. The bearing stator according to claim 1, wherein a plurality of the frames are disposed in the winding groove at intervals.

12. The bearing stator according to claim 11, wherein a length of the frame along a direction in which the frame and the winding groove are matched is equal to a width of the winding groove; and
   a height of the frame is less than, equal to or greater than a depth of the winding groove.

13. The bearing stator according to claim 1, wherein a side of the bearing iron core facing away from the winding groove is provided with a through hole for a winding wire to pass through, the through hole corresponds to the frame and is communicated to the winding groove; and
   the bottom of the frame is provided with a convex portion matched with the through hole, and the convex portion is used to locate the frame and the bearing iron core.

14. The bearing stator according to claim 13, wherein the through hole is an elliptical hole, and a length of through hole in the long axis direction is less than a length of a bottom of the frame.

15. The bearing stator according to claim 1, wherein potting glue used to seal and fasten the axial winding is disposed in the winding groove.

16. The bearing stator according to claim 1, wherein the axial winding is provided with a first winding wire and a second winding wire, a bottom of the frame is provided with a first winding wire through hole and a second winding wire through hole; and
   the first winding wire passes through the first winding wire through hole and extends to a side of the bearing iron core facing away from the winding groove, and the second winding wire passes through the second winding wire through hole and extends to a side of the bearing iron core facing away from the winding groove.

17. A compressor, comprising a bearing stator, wherein the bearing stator comprises:
   a frame, the frame being provided with an accommodation recess, a position-limiting portion being disposed in the accommodation recess, and each of outer wall surfaces at two sides of the accommodation recess being provided with a first positioning portion;

a bearing iron core, any one of axial end surfaces of the bearing iron core being provided with a winding groove, the winding groove being provided with a second positioning portion on two opposite sides of the bearing iron core along a radial direction of the bearing iron core, and the second positioning portion being clamped with the first positioning portion; and an axial winding, the axial winding being located in the winding groove, and a part, corresponding to the frame, of the axial winding being pressed into the accommodation recess;

wherein the position-limiting portion is used to limit the axial winding in the accommodation recess.

18. The compressor according to claim 17, wherein a length of the frame along a circumferential direction of the bearing iron core is less than a circumferential length of the axial winding.

19. The compressor according to claim 17, wherein the accommodation recess is a through recess, and the position-limiting portion is a protrusion at a recess opening of the accommodation recess.

20. A conditioner, comprising a compressor, the compressor comprising a bearing stator, wherein the bearing stator comprises:

a frame, the frame being provided with an accommodation recess, a position-limiting portion being disposed in the accommodation recess, and each of outer wall surfaces at two sides of the accommodation recess being provided with a first positioning portion;

a bearing iron core, any one of axial end surfaces of the bearing iron core being provided with a winding groove, the winding groove being provided with a second positioning portion on two opposite sides of the bearing iron core along a radial direction of the bearing iron core, and the second positioning portion being clamped with the first positioning portion; and an axial winding, the axial winding being located in the winding groove, and a part, corresponding to the frame, of the axial winding being pressed into the accommodation recess;

wherein the position-limiting portion is used to limit the axial winding in the accommodation recess.

* * * * *